US012790232B2

(12) United States Patent
Kaseda

(10) Patent No.: US 12,790,232 B2
(45) Date of Patent: Nov. 10, 2026

(54) BATTERY

(71) Applicant: AESC JAPAN LTD., Kanagawa (JP)

(72) Inventor: Manabu Kaseda, Kanagawa (JP)

(73) Assignee: AESC JAPAN LTD., Kanagawa (JP)

( * ) Notice: Subject to any disclaimer, the term of this patent is extended or adjusted under 35 U.S.C. 154(b) by 597 days.

(21) Appl. No.: 18/264,634

(22) PCT Filed: Feb. 3, 2022

(86) PCT No.: PCT/JP2022/004213
§ 371 (c)(1),
(2) Date: Aug. 8, 2023

(87) PCT Pub. No.: WO2022/172851
PCT Pub. Date: Aug. 18, 2022

(65) Prior Publication Data
US 2024/0055594 A1 Feb. 15, 2024

(30) Foreign Application Priority Data
Feb. 10, 2021 (JP) ................................. 2021-019627

(51) Int. Cl.

| | |
|---|---|
| ***H01M 4/525*** | (2010.01) |
| ***H01M 4/131*** | (2010.01) |
| ***H01M 10/0525*** | (2010.01) |
| ***H01M 10/0585*** | (2010.01) |
| ***H01M 50/46*** | (2021.01) |
| *H01M 4/02* | (2006.01) |
| *H01M 4/505* | (2010.01) |

(52) U.S. Cl.
CPC ........... *H01M 4/525* (2013.01); *H01M 4/131* (2013.01); *H01M 10/0525* (2013.01); *H01M 10/0585* (2013.01); *H01M 50/46* (2021.01); *H01M 2004/028* (2013.01); *H01M 4/505* (2013.01)

(58) Field of Classification Search
CPC .. H01M 4/525; H01M 4/131; H01M 10/0585; H01M 2004/028; H01M 10/0525; H01M 50/46
See application file for complete search history.

(56) References Cited

U.S. PATENT DOCUMENTS

2012/0100413 A1 4/2012 Okano et al.

FOREIGN PATENT DOCUMENTS

| | | | |
|---|---|---|---|
| CN | 111129485 A | | 5/2020 |
| EP | 1 043 782 | * | 10/2000 |

(Continued)

OTHER PUBLICATIONS

Ren et al., "Enabling High-Voltage Lithium-Metal Batteries under Practical Conditions", Joule, Jul. 17, 2019, vol. 3, pp. 1662-1676; Cited in EESR.

*Primary Examiner* — Laura Weiner
(74) *Attorney, Agent, or Firm* — Rankin, Hill & Clark LLP

(57) ABSTRACT

A positive electrode (100) includes a first positive electrode active material layer (122) containing a positive electrode active material expressed by a general formula $Li_xNi_yCo_zM_{1-y-z}O_2$ (where 0.80≤y≤0.93, and M denotes a metallic element containing at least one element out of Mn and Al). The length of the first positive electrode active material layer (122) in a longitudinal direction is equal to or greater than 300 mm and equal to or less than 740 mm.

6 Claims, 10 Drawing Sheets

(56) References Cited

FOREIGN PATENT DOCUMENTS

| | | | | |
|---|---|---|---|---|
| JP | 2006-173095 | A | | 6/2006 |
| JP | 2015-011969 | | * | 1/2015 |
| JP | 2015-011969 | A | | 1/2015 |
| JP | 2017-033827 | A | | 2/2017 |
| JP | 2017-063041 | A | | 3/2017 |
| JP | 2019-145330 | A | | 8/2019 |
| WO | 2015/146024 | A1 | | 10/2015 |
| WO | 2015/156399 | A1 | | 10/2015 |
| WO | 2017/038041 | A1 | | 3/2017 |
| WO | WO 2017/214247 | | * | 12/2017 |

* cited by examiner

BATTERY

TECHNICAL FIELD

The present invention relates to a battery.

BACKGROUND ART

In recent years, nonaqueous electrolyte batteries such as a lithium-ion secondary battery have been developed. The battery includes a positive electrode, a negative electrode, and a separator. The positive electrode includes a positive electrode collector and a positive electrode active material layer. The negative electrode includes a negative electrode collector and a negative electrode active material layer. The separator separates the positive electrode and the negative electrode from each other.

Patent Document 1 describes an example of a lithium-ion secondary battery in which a positive electrode and a negative electrode are stacked. In the battery, a positive electrode active material layer contains a lithium-nickel-based composite oxide with a layered crystal structure, the composition ratio of a nickel element in the composite oxide with respect to the total of the nickel element, a cobalt element, and a manganese element being 0.4. The length of the positive electrode in a longitudinal direction is 250 mm. Further, the ratio of the output to the capacity of the battery is less than 25 W/Wh.

Patent Document 2 describes an example of a lithium-ion secondary battery in which a positive electrode and a negative electrode are stacked. In the battery, a positive electrode active material contains a lithium-nickel-based composite oxide with a layered crystal structure, the composition ratio of a nickel element in the composite oxide with respect to the total of the nickel element, a cobalt element, and a manganese element being 0.8.

Patent Document 3 describes an example of a lithium-ion secondary battery in which a positive electrode, a negative electrode, and a separator are wound. In the battery, a positive electrode active material contains a lithium-nickel-based composite oxide with a layered structure, the composition ratio of a nickel element in the composite oxide with respect to the total of the nickel element, a cobalt element, and an aluminum element being 0.8.

RELATED DOCUMENT

Patent Document

Patent Document 1: Japanese Patent Application Publication No. 2017-33827
Patent Document 2: International Application Publication No. WO 2015/156399
Patent Document 3: Japanese Patent Application Publication No. 2017-63041

DISCLOSURE OF THE INVENTION

Technical Problem

A battery such as a lithium-ion secondary battery desirably has high capacity and high output. As a result of examination by the present inventor, it has become apparent that capacity and output of a battery is related to the length of a positive electrode active material layer in the longitudinal direction. On the other hand. Patent Documents 1 to 3 do not describe a relation between the length of a positive electrode active material layer in the longitudinal direction, and capacity and output of a battery.

An example of an object of the present invention is to provide a high-capacity and high-output battery. Other objects of the present invention will become apparent from the description herein.

Solution to Problem

An aspect of the present invention is a battery including a positive electrode, wherein the positive electrode includes a positive electrode active material layer containing a positive electrode active material expressed by a general formula $Li_xNi_yCo_zM_{1-y-z}O_2$ (where $0.80 \leq y \leq 0.93$, and M denotes a metallic element containing at least one element out of Mn and Al), and a length of the positive electrode active material layer in a longitudinal direction is equal to or greater than 300 mm and equal to or less than 740 mm.

Advantageous Effects of Invention

According to the aforementioned aspect of the present invention, a high-capacity and high-output battery can be provided.

DESCRIPTION OF EMBODIMENTS

An embodiment of the present invention will be described by using drawings. Note that in each drawing, similar components are given similar signs, and description thereof is omitted as appropriate.

Figure 1:
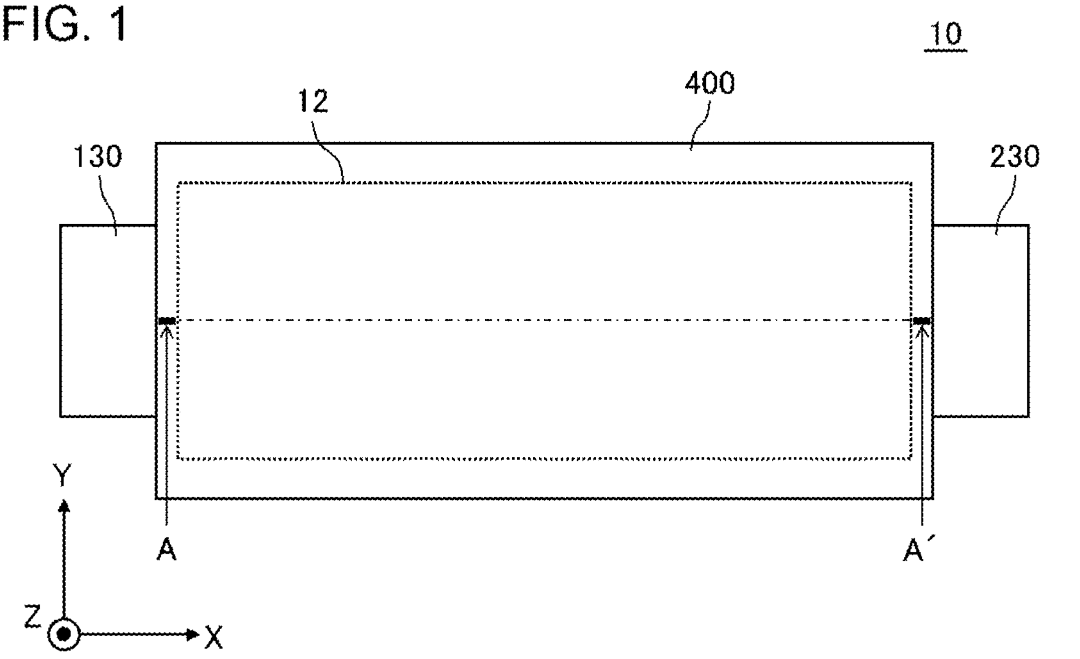
FIG. 1 is a plan view of a battery according to an embodiment.
Figure 2:
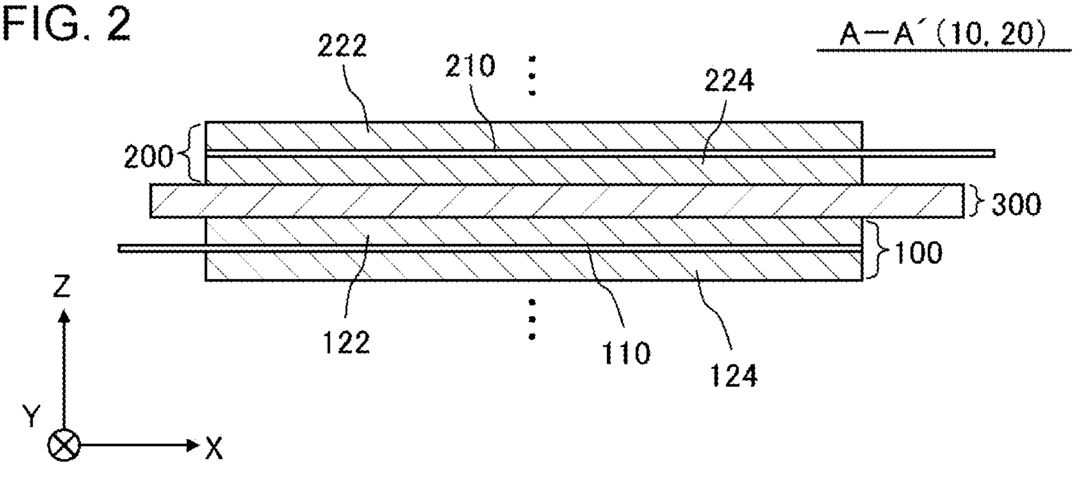
FIG. 2 is an A-A' line cross-sectional view of FIG. 1.
Figure 3:
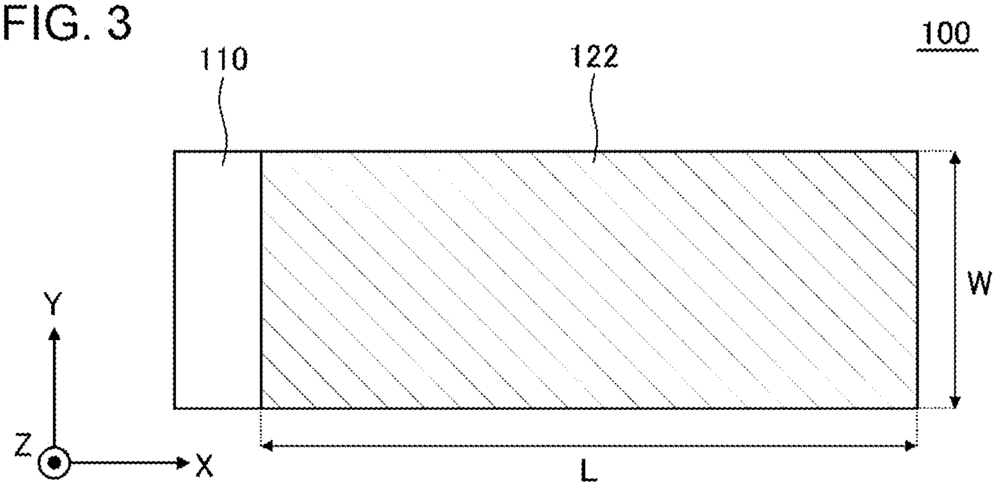
FIG. 3 is a plan view of a positive electrode according to the embodiment.

FIG. 1 is a plan view of a battery 10 according to an embodiment. FIG. 2 is an A-A' line cross-sectional view of FIG. 1. FIG. 3 is a plan view of a positive electrode 100 according to the embodiment.

In FIG. 1 to FIG. 3, a first direction X indicates a lengthwise direction of the battery 10. A positive direction of the first direction X being a direction indicated by an arrow indicating the first direction X is a direction from a positive electrode lead 130 to be described later toward a negative electrode lead 230. A negative direction of the first direction X being a direction opposite to the direction indicated by the arrow indicating the first direction X is a direction from the negative electrode lead 230 toward the positive electrode lead 130. A second direction Y intersects with, specifically lies at right angles to, the first direction X and indicates a widthwise direction of the battery 10. A third direction Z intersects with, specifically lies at right angles to, both the first direction X and the second direction Y and indicates a thickness direction of the battery 10. Further, in FIG. 1 and FIG. 3, an open circle marked with a dot indicating the third direction Z indicates that a direction from the back to the front of the page is a positive direction of the third direction Z and that a direction from the front to the back of the page indicates a negative direction of the third direction Z. In FIG. 2, an open circle marked with X indicated by the second direction Y indicates that the direction from the front to the back of the page is a positive direction of the second direction Y and that the direction from the back to the front of the page is a negative direction of the second direction Y.

The battery 10 according to the present embodiment is placed in such a way that the thickness direction of the battery 10, that is, the third direction Z is parallel to a vertical direction. Further, a positive direction of the third direction Z being a direction indicated by an arrow indicating the third direction Z is a vertical upward direction. On the other hand, a negative direction of the third direction Z being a direction opposite to the direction indicated by the arrow indicating the third direction Z is a vertical downward direction.

The battery 10 will be described by using FIG. 1. The battery 10 according to the present embodiment is a lithium-ion secondary battery.

The battery 10 includes the positive electrode lead 130, the negative electrode lead 230, and an exterior material 400.

The positive electrode lead 130 is electrically connected to the positive electrode 100 illustrated in FIG. 2 to be described later. For example, the positive electrode lead 130 is formed of aluminum or an aluminum alloy.

The negative electrode lead 230 is electrically connected to a negative electrode 200 illustrated in FIG. 2 to be described later. For example, the negative electrode lead 230 is formed of copper, a copper alloy, or a product acquired by nickel plating the above.

The exterior material 400 has a rectangular shape including four sides. According to the present embodiment, the positive electrode lead 130 is provided on a side of the exterior material 400 positioned on the negative direction side in the first direction X, and the negative electrode lead 230 is provided on a side of the exterior material 400 positioned on the positive direction side in the first direction X. Note that the positive electrode lead 130 and the negative electrode lead 230 may be provided on a common side of the exterior material 400 (such as the side positioned on the positive direction side or the negative direction side in the first direction X).

The exterior material 400 accommodates a stacked body 20 illustrated in FIG. 2 to be described later along with an electrolytic solution (unillustrated).

For example, the exterior material 400 includes a thermally adhesive resin layer and a barrier layer and is, for example, a laminated film including a thermally adhesive resin layer and a barrier layer.

For example, a resin material forming the thermally adhesive resin layer is polyethylene (PE) or polypropylene. For example, the thickness of the thermally adhesive resin layer is equal to or greater than 20 μm and equal to or less than 200 μm.

For example, the barrier layer has a barrier property such as prevention of leakage of an electrolytic solution or ingress of water from outside and is, for example, a barrier layer formed of metal such as stainless (SUS) foil, aluminum foil, aluminum alloy foil, copper foil, or titanium foil. For example, the thickness of the barrier layer is equal to or greater than 10 pin and equal to or less than 100 μm.

The thermally adhesive resin layer of the laminated film may be single-layer or multilayer. Similarly, the barrier layer of the laminated film may be single-layer or multilayer.

For example, the electrolytic solution is a nonaqueous electrolyte solution. For example, the nonaqueous electrolyte solution contains a lithium salt and a solvent dissolving a lithium salt.

Examples of a lithium salt include $LiClO_4$, $LiBF_4$, $LiBF_6$, $LiPF_6$, $LiCF_3SO_3$, $LiCF_3CO_2$, $LiAsF_6$, $LiSbF_6$, $LiBi_{10}Cl_{10}$, $LiAlCl_4$, LiCl, LiBr, $LiB(CH_5)_4$, $CF_3SO_3Li$, $CH_3SO_3Li$, $LiC_4F_9SO_3$, $Li(CF_3SO_2)_2N$, $Li(C_2F_5SO_2)_2N$, and a lower fatty acid lithium carboxylate.

Examples of a solvent dissolving a lithium salt include carbonates such as ethylene carbonate (EC), propylene carbonate (PC), butylene carbonate (BC), dimethyl carbonate (DMC), ethyl methyl carbonate (EMC), diethyl carbonate (DEC), methyl ethyl carbonate (MEC), and vinylene carbonate (VC), lactones such as γ-butyrolactone and γ-valerolactone; ethers such as trimethoxymethane, 1,2-dimethoxyethane, diethyl ether, tetrahydrofuran, and 2-methyltetrahydrofuran; sulfoxides such as dimethyl sulfoxide; oxolanes such as 1,3-dioxolane and 4-methyl-1,3-dioxolane; nitrogen-containing solvents such as acetonitrile, nitromethane, formamide, and dimethylformamide; organic esters such as methyl formate, methyl acetate, ethyl acetate, butyl acetate, methyl propionate, and ethyl propionate; phosphate triester and diglymes; triglymes; sulfolanes such as sulfolane and methyl sulfolane; oxazolidinones such as 3-methyl-2-oxazolidinone; and sultones such as 1,3-propane sultone, 1,4-butane sultone, and naphthasultone. The substances may be singly used or may be used in combination.

The stacked body 20 will be described by using FIG. 2.

The stacked body 20 includes a plurality of positive electrodes 100, a plurality of negative electrodes 200, and a separator 300. The plurality of positive electrodes 100 and the plurality of negative electrodes 200 are alternately arranged in the third direction Z. For example, the total number of the plurality of positive electrodes 100 may be equal to or greater than 16 and equal to or less than 54. Further, for example, the total number of the plurality of negative electrodes 200 may be greater than the total number of the positive electrodes 100 by one. The separator 300 separates the positive electrodes 100 and the negative electrodes 200 adjoining in the third direction Z from each other. In one example, the separator 300 extends zigzag in such a way as to pass through between the positive electrode 100 and the negative electrode 200 adjoining each other while folding back along the second direction Y. Alternatively, each of a plurality of separators 300 may be positioned between a positive electrode 100 and a negative electrode 200 adjoining each other. Note that the stacked body 20 may include only one positive electrode 100 and only one negative electrode 200.

Details of the positive electrode 100 will be described. The positive electrode 100 includes a positive electrode collector 110, a first positive electrode active material layer 122, and a second positive electrode active material layer 124.

The first positive electrode active material layer 122 is positioned IC on the top surface of the positive electrode collector 110. The second positive electrode active material layer 124 is positioned on the bottom surface of the positive electrode collector 110.

An end of the positive electrode collector 110 on the negative direction side in the first direction X is connected to the positive electrode lead 130 illustrated in FIG. 1.

For example, the positive electrode collector 110 is formed of aluminum, stainless steel, nickel, titanium, or an alloy of the above. For example, the shape of the positive electrode collector 110 is foil, a flat plate, or a mesh. For example, the thickness of the positive electrode collector 110 is equal to or greater than 1 μm and equal to or less than 50 μm.

The first positive electrode active material layer 122 contains a positive electrode active material, a binder resin, and a conductive assistant. Details of the first positive electrode active material layer 122 are as follows. The details of the first positive electrode active material layer 122 described below apply to the second positive electrode active material layer 124 as well unless otherwise noted.

The positive electrode active material is expressed by a general formula $Li_xNi_yCo_zM_{1-y-z}O_2$ (where $0.80 \leq y \leq 0.93$, and M denotes a metallic element containing at least one element out of Mn and Al). A composition ratio y falling within the aforementioned range enables a low cost, a high capacity per unit weight, and a stabilized crystal structure of the positive electrode active material. Further, the composition ratio y falling within the aforementioned range enables suppression of degradation in thermal stability in a state of charge compared with a case of the composition ratio y exceeding the aforementioned range. In the general formula, x satisfies $1 \leq x \leq 1.2$, and y and z denote positive numbers satisfying $y+z<1$. Since a single-phase composite oxide is less likely to be synthesized as the proportion of manganese increases, it is desirable that $1-y-z \leq 0.4$ be satisfied. Further, since an increased proportion of cobalt leads to a higher cost and a smaller capacity, it is desirable that $z<y$ and $z<1-y-z$ be satisfied. It is particularly preferable that $y>1-y-z$ and $y>z$ be satisfied in order to acquire a high-capacity battery. For example, the positive electrode active material is a lithium-nickel-based composite oxide such as a lithium-nickel-cobalt-manganese composite oxide with a layered crystal structure expressed by the aforementioned general formula.

For example, the first positive electrode active material laver 122 contains a positive electrode active material the concentration of which is equal to or greater than 90 weight %, and equal to or less than 99 weight % with respect to a total weight 100 weight % of the first positive electrode active material layer 122.

For example, the total weight per unit area of the first positive electrode active material layer 122 and the second positive electrode active material layer 124 is equal to or greater than 25 $mg/cm^2$ and equal to or less than 50 $mg/cm^2$.

Examples of the binder resin contained in the first positive electrode active material layer 122 include thermoplastic polymers such as polyethylene, polypropylene, polyethylene terephthalate (PET), polyether nitrile, polyacrylonitrile, polyimide, polyamide, cellulose, carboxymethylcellulose (CMC), an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and a hydrogenated product thereof, and a styrene-isoprene-styrene block copolymer and a hydrogenated product thereof; fluororesins such as poly(vinylidene fluoride) (PVdF), polytetrafluoroethylene (PTFE), a tetrafluoroethylene-hexafluoropropylene copolymer (FEP), a tetrafluoroethylene-perfluoroalkylvinylether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF); vinylidene fluoride-based fluororubber such as vinylidene fluoride-hexafluoropropylene-based fluororubber (VDF-HFP-based fluororubber), vinylidene fluoride-hexafluoropropylene-tetrafluoroethylene-based fluororubber (VDF-HFP-TFE-based fluororubber), vinylidene fluoride-pentafluoropropylene-based fluororubber (VDF-PFP-based fluororubber), vinylidene fluoride-pentafluoropropylene-tetrafluoroethylene-based fluororubber (VDF-PFP-TFE-based fluororubber), vinylidene fluoride-perfluoromethylvinylether-tetrafluoroethylene-based fluororubber (VDF-PFMVE-TFE-based fluororubber), and vinylidene fluoride-chlorotrifluoroethylene-based fluororubber (VDF-CTFE-based fluororubber); and epoxy resin. Among the above, the binder resin is more preferably poly(vinylidene fluoride) (PVdF), polyimide, styrene-butadiene rubber (SBR), carboxymethylcellulose (CMC), polypropylene, polytetrafluoroethylene (PTFE), polyacrylonitrile, or polyamide. The preferable binder resins have excellent heat resistance and further have a very wide potential window providing stability at both a positive electrode potential and a negative electrode potential, and therefore can be used in an active material layer. One type of the binder resins may be singly used, or two or more types may be used in combination.

An amount of the binder resin contained in the first positive electrode active material layer 122 may be appropriately determined. For example, the first positive electrode active material layer 122 contains the binder resin the concentration of which is equal to or greater than 0.1 weight % and equal to or less than 10.0 weight % with respect to the total weight 100 weight % of the first positive electrode active material layer 122.

Examples of the conductive assistant contained in the first positive electrode active material layer 122 include carbon fibers such as carbon black, ketjen black, acetylene black, natural graphite, synthetic graphite, a carbon nanotube, a carbon nanofiber, and a carbon nanohorn. For example, graphite is scaly graphite or spherical graphite. The substances may be singly used or may be used in combination.

An amount of the conductive assistant contained in the first positive electrode active material layer 122 may be appropriately determined. For example, the first positive electrode active material layer 122 contains the conductive assistant the concentration of which is equal to or greater than 0.1 weight % and equal to or less than 8.0 weight % with respect to the total weight 100 weight % of the first positive electrode active material layer 122.

The first positive electrode active material layer 122 may appropriately contain a pH regulator (such as oxalic acid, malonic acid, succinic acid, glutaric acid, adipic acid, pimelic acid, suberic acid, azelaic acid, sebacic acid, phthalic acid, or fumaric acid) for neutralizing an alkaline component contained in the positive electrode active material for prevention of gelation of slurry, or the like.

A length L of the first positive electrode active material layer 122 in a longitudinal direction falls within a predetermined range as will be described later. The length L of the first positive electrode active material layer 122 in the longitudinal direction falling within the predetermined range enables high capacity and high output of the battery 10.

A length W of the first positive electrode active material layer 122 in a transverse direction is equal to or greater than 70 mm and equal to or less than 120 mm.

The thickness of the first positive electrode active material layer 122 may be appropriately determined. For example, the thickness of the first positive electrode active material layer 122 is equal to or greater than 35 μm and equal to or less than 65 μm.

Details of the negative electrode 200 will be described. The negative electrode 200 includes a negative electrode collector 210, a first negative electrode active material layer 222, and a second negative electrode active material layer 224.

The first negative electrode active material layer 222 is positioned on the top surface of the negative electrode collector 210. The second negative electrode active material layer 224 is positioned on the bottom surface of the negative electrode collector 210.

An end of the negative electrode collector 210 on the positive direction side in the first direction X is connected to the negative electrode lead 230 illustrated in FIG. 1.

For example, the negative electrode collector 210 is formed of copper, stainless steel, nickel, titanium, or an alloy of the above. For example, the shape of the negative electrode collector 210 is foil, a flat plate, or a mesh. For example, the thickness (third direction Z) of the negative electrode collector 210 in the third direction Z is equal to or greater than 1 μm and equal to or less than 50 μm.

The first negative electrode active material layer 222 contains a negative electrode active material and a binder resin. The first negative electrode active material layer 222 may further contain a conductive assistant as needed. Details of the first negative electrode active material layer 222 are as follows. The details of the first negative electrode active material layer 222 described below apply to the second negative electrode active material layer 224 as well unless otherwise noted.

Without being limited to the following, examples of the negative electrode active material preferably include metals such as Si and Sn; metallic oxides such as TiO, $Ti_2O_3$, $TiO_2$, $SiO_2$, SiO, and $SnO_2$; composite oxides of lithium and a transition metal such as $Li_4Ti_5O_{12}$ and $Li_7MnN$; a Li—Pb-based alloy, a Li—Al-based alloy, and Li; and carbon materials such as carbon powder, graphite (natural graphite and synthetic graphite), carbon black, activated carbon, a carbon fiber, coke, soft carbon, and hard carbon. Use of an element alloyed with lithium among the above enables acquisition of a battery with a high capacity and an excellent output characteristic having a higher energy density compared with a conventional carbon-based material. One type of the negative electrode active materials may be singly used, or two or more types may be used in combination. Without being limited to the following, specific examples of the aforementioned element alloyed with lithium include Si. Ge, Sri, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te, and Cl.

For example, the first negative electrode active material layer 222 contains the negative electrode active material the concentration of which is equal to or greater than 90 weight % and equal to or less than 99 weight % with respect to a total weight 100 weight % of the first negative electrode active material layer 222.

For example, the total weight per unit area of the first negative electrode active material layer 222 and the second negative electrode active material layer 224 is equal to or greater than 12 $mg/cm^2$ and equal to or less than 28 $mg/cm^2$.

When an organic solvent is used as a solvent for acquiring slurry, for example, the binder resin contained in the first negative electrode active material layer 222 may be the binder resin exemplified as the binder resin contained in the first positive electrode active material layer 122. Further, when water is used as a solvent for acquiring slurry, examples of the binder resin contained in the first negative electrode active material layer 222 may include styrene-based polymers (such as styrene-butadiene rubber, a styrene-vinyl acetate copolymer, and a styrene-acrylic copolymer), acrylonitrile-butadiene rubber, methacrylate-butadiene rubber, (meth)acrylic polymers [such as poly(ethyl acrylate), poly(ethyl methacrylate), poly(propyl acrylate), poly (methyl methacrylate) (methyl methacrylate rubber), poly (propyl methacrylate), poly(isopropyl acrylate), poly(isopropyl methacrylate), poly(butyl acrylate), poly(butyl methacrylate), poly(hexyl acrylate), poly(hexyl methacrylate, poly(ethylhexyl acrylate), poly(ethylhexyl methacrylate), poly(lauryl acrylate), and poly(lauryl methacrylate)], polytetrafluoroethylene, polyethylene, polypropylene, an ethylene-propylene copolymer, polybutadiene, butyl rubber, fluororubber, poly(ethylene oxide), polyepichlorohydrin, polyphosphazene, polyacrylonitrile, polystyrene, an ethylene-propylene-diene copolymer, polyvinylpyridine, chlorosulfonated polyethylene, polyester resin, phenolic resin, and epoxy resin; and water-soluble polymers such as poly(vinyl alcohol) (with a mean degree of polymerization being preferably 200 to 4000 and more preferably 1000 to 3000 and a degree of saponification being preferably equal to or greater than 80 mol % and more preferably equal to or greater than 90 mol %) and a modified product thereof [such as a 1 to 80 mol % saponified product in a vinyl acetate unit in a copolymer with a molar ratio of ethylene/vinyl acetate=2/98 to 30/70 and a 1 to 50 mol % partially acetalized product in poly(vinyl alcohol)], starch and a modified product thereof (such as oxidized starch, phosphated starch, and cationized starch), cellulose derivatives [such as carboxyethylcellulose (CMC), methylcellulose, hydroxypropylcellulose, hydroxyethyl cellulose, and salt thereof], polyvinylpyrrolidone, polyacrylic acid (polyacrylate), polyethylene glycol, a copolymer of (meth)acrylamide and/or (meth)acrylate [such as a (meth)acrylamide polymer, a (meth)acrylamide-(meth)acrylate copolymer, an alkyl (having one to four carbon atoms) (meth)acrylate-(meth)acrylate copolymer], a styrene-maleate copolymer, a Mannich modified product of polyacrylamide, formalin condensation type resins (such as urea-formalin resin and melamine-formalin resin), a polyamide-polyamine or dialkylamine-epichlorohydrin copolymer, polyethyleneimine, casein, soybean protein, synthetic protein, and a mannan-galactan derivative. The aqueous binder resins may be in an emulsion form. Further, one type of the aqueous binders may be singly used, or two or more types may be used in combination.

An amount of the binder resin contained in the first negative electrode active material layer 222 may be appropriately determined. For example, the first negative electrode active material layer 222 contains the binder resin the concentration of which is equal to or greater than 0.1 weight % and equal to or less than 10.0 weight % with respect to the total weight 100 weight % of the first negative electrode active material layer 222.

The length of the first negative electrode active material layer 222 in the longitudinal direction may be appropriately determined according to the length L of the first positive electrode active material layer 122 in the longitudinal direction.

The length of the first negative electrode active material layer 222 in the transverse direction may be appropriately determined according to the length W of the first positive electrode active material layer 122 in the transverse direction.

The thickness of the first negative electrode active material layer 222 may be appropriately determined. For example, the thickness of the first negative electrode active material layer 222 is equal to or greater than 40 μm and equal to or less than 75 μm.

Details of the separator 300 will be described.

The separator 300 has a function of electrically isolating the positive electrode 100 from the negative electrode 200 and causing ions (such as lithium ions) to permeate. For example, the separator 300 may be a porous separator.

The shape of the separator 300 may be appropriately determined according to the shape of the positive electrode 100 or the negative electrode 200 and may be, for example, a rectangle.

The substrate 310 includes a porous resin layer containing a polyolefin as a main ingredient. Specifically, the porous resin layer contains a polyolefin the concentration of which is equal to or greater than 50 weight %, preferably equal to or greater than 70 weight %, and more preferably equal to or greater than 90 weight % with respect to a total weight 100 weight % of the porous resin layer and may contain 100 weight % of a polyolefin with respect to the total weight 100 weight % of the porous resin layer. The porous resin layer may be a single layer or may include two or more types of layers Examples of the polyolefin include polypropylene and polyethylene.

The thickness (third direction Z) of the separator 300 may be appropriately determined and may be, for example, equal to or greater than 8.0 μm and equal to or less than 45.0 μm.

Examples

Figure 4:
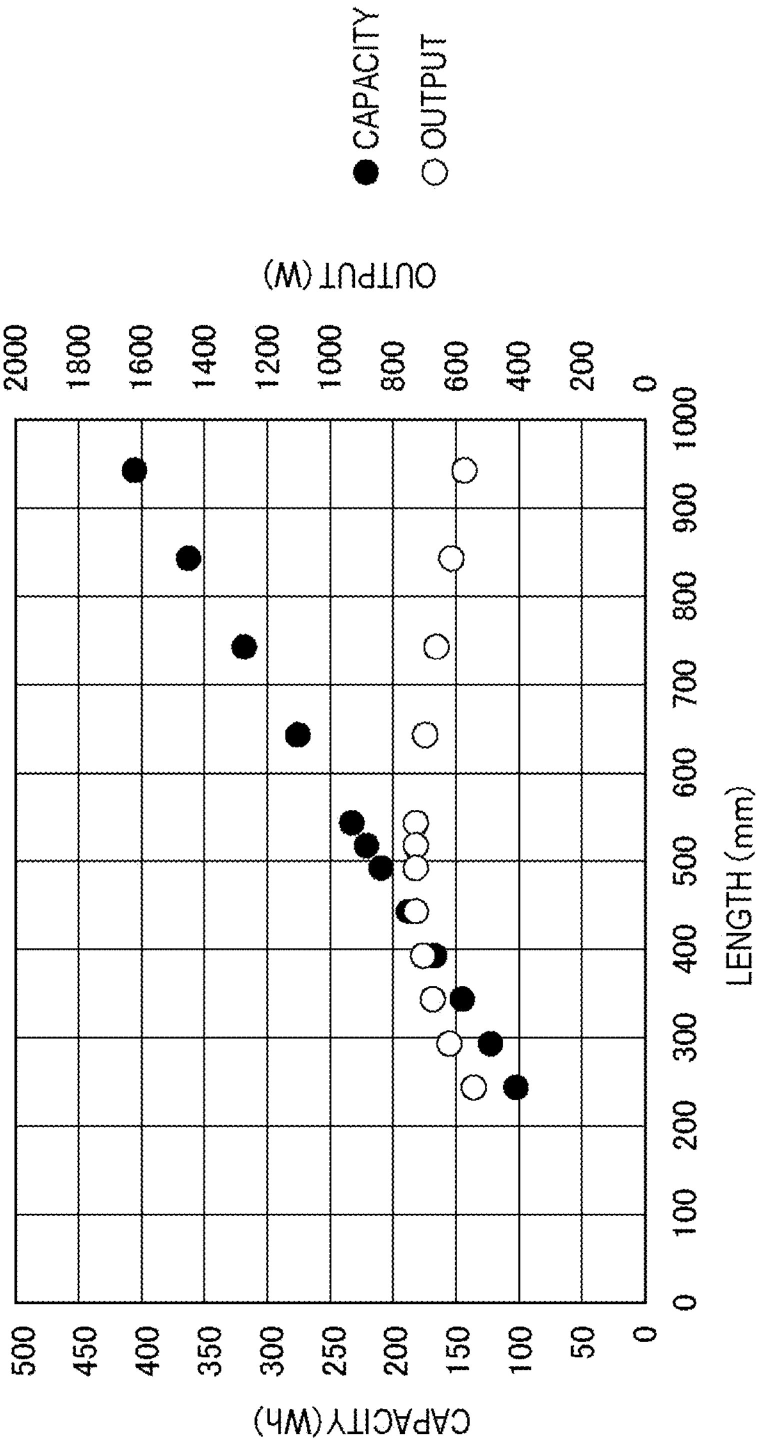
FIG. 4 is a graph illustrating an example of a relation between the length of a positive electrode active material layer in a longitudinal direction, and the capacity of the battery and the output of the battery when the battery includes a 16-layer positive electrode.
Figure 5:
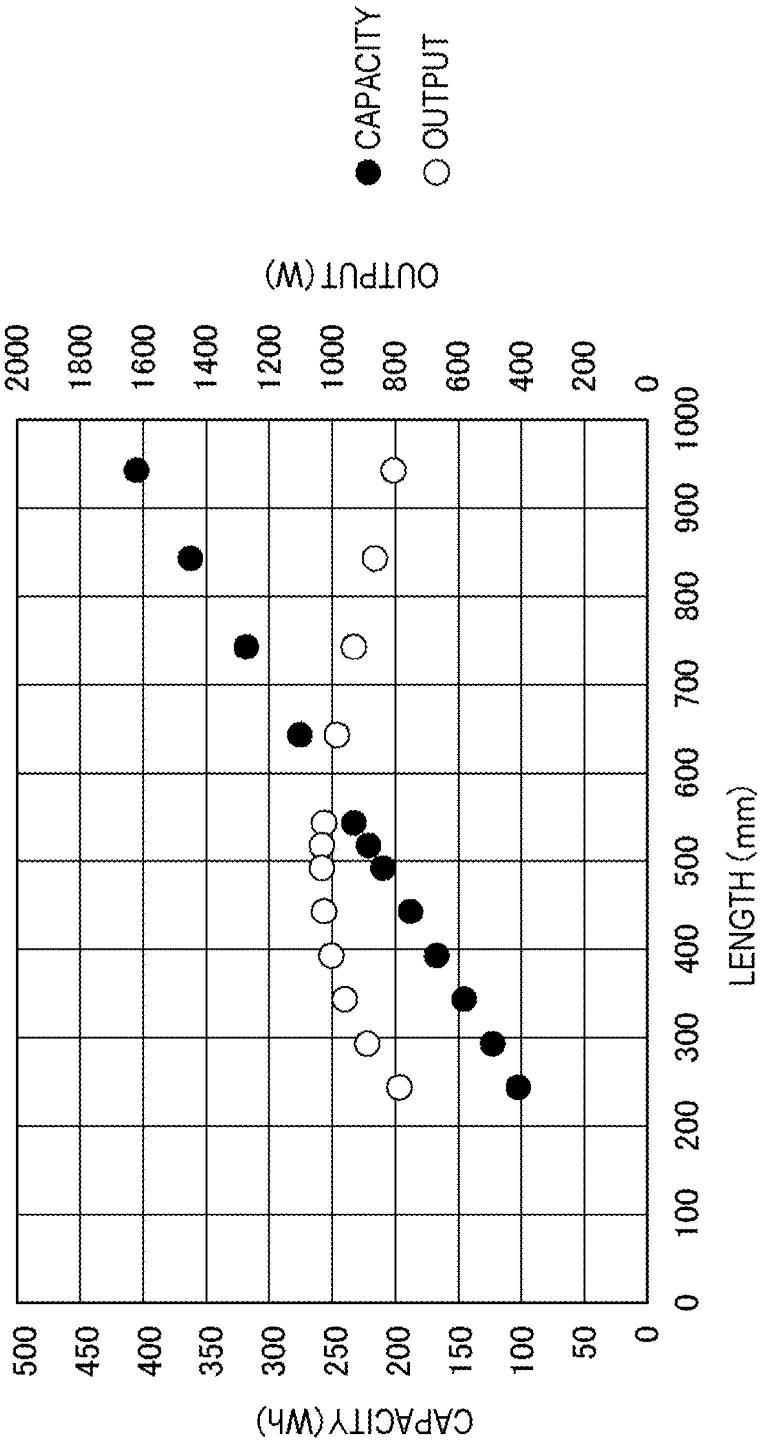
FIG. 5 is a graph illustrating an example of a relation between the length of the positive electrode active material layer in the longitudinal direction, and the capacity of the battery and the output of the battery when the battery includes a 23-layer positive electrode.
Figure 6:
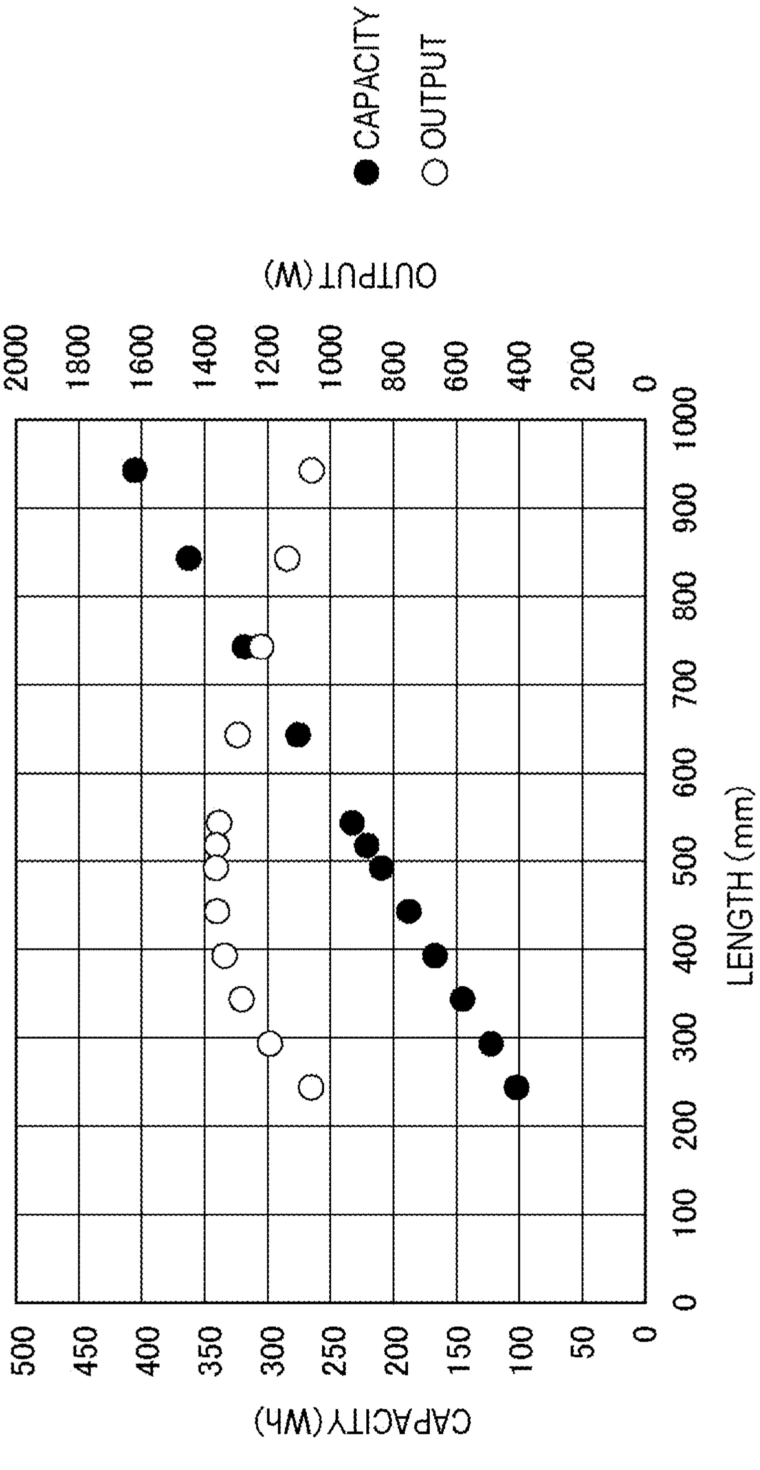
FIG. 6 is a graph illustrating an example of a relation between the length of the positive electrode active material layer in the longitudinal direction, and the capacity of the battery and the output of the battery when the battery includes a 31-layer positive electrode.
Figure 7:
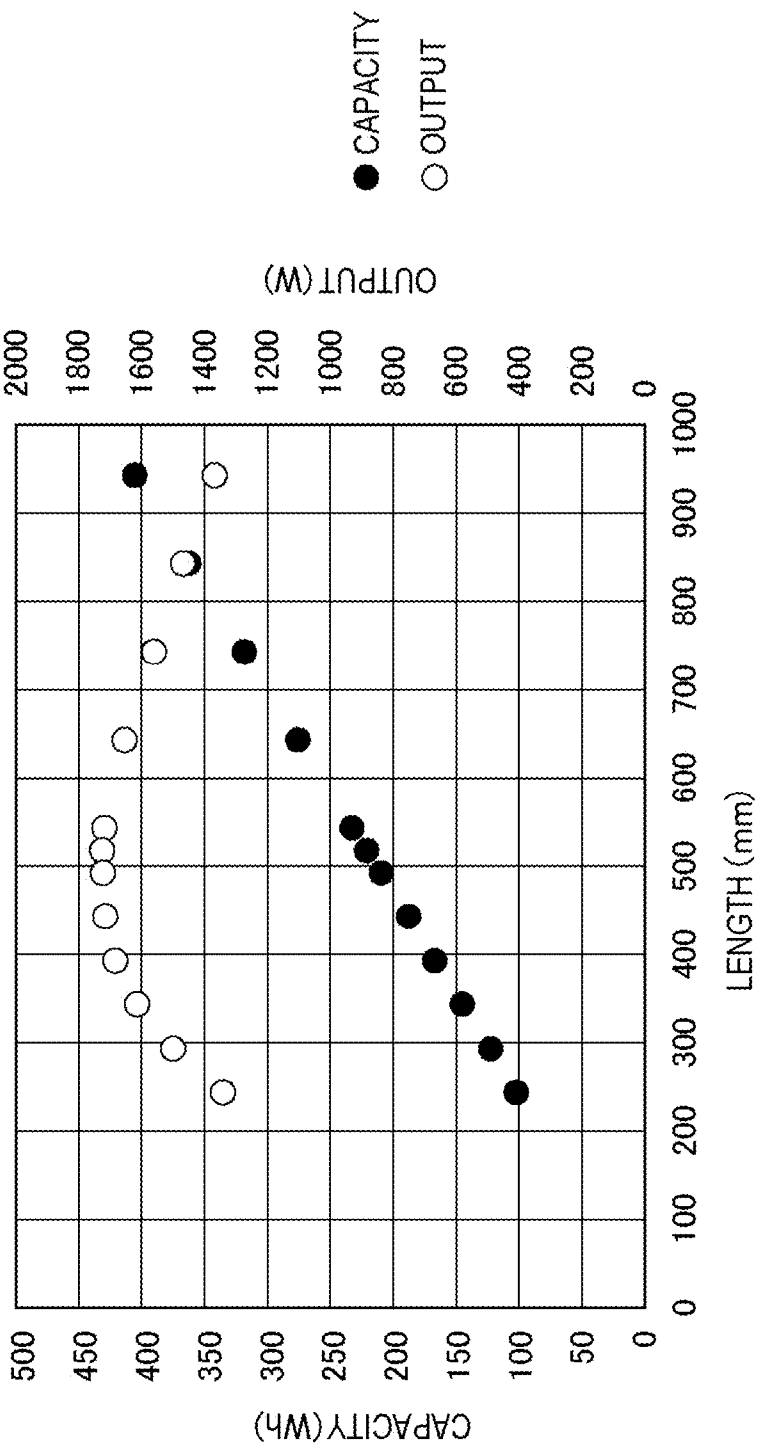
FIG. 7 is a graph illustrating an example of a relation between the length of the positive electrode active material layer in the longitudinal direction, and the capacity of the battery and the output of the battery when the battery includes a 42-layer positive electrode.
Figure 8:
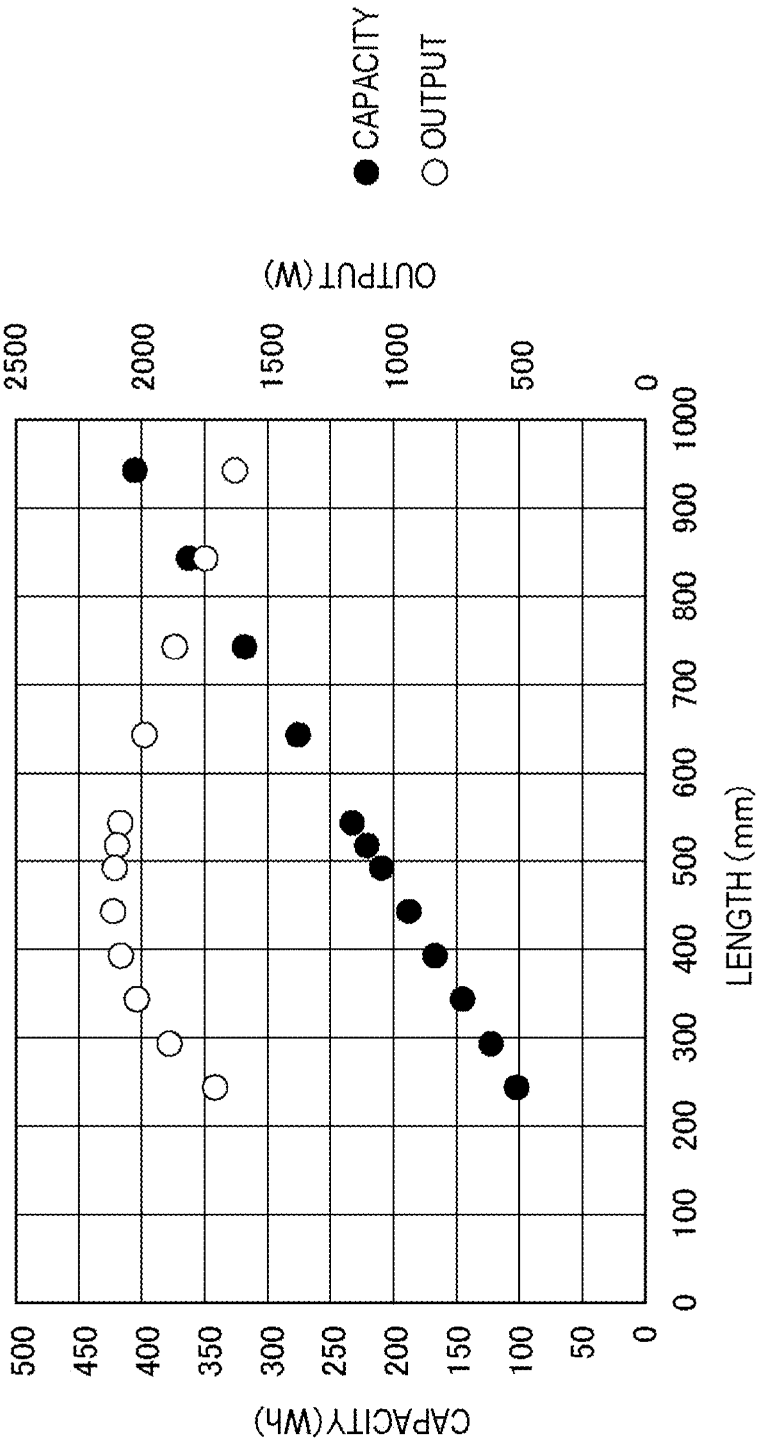
FIG. 8 is a graph illustrating an example of a relation between the length of the positive electrode active material layer in the longitudinal direction, and the capacity of the battery and the output of the battery when the battery includes a 50-layer positive electrode.
Figure 9:
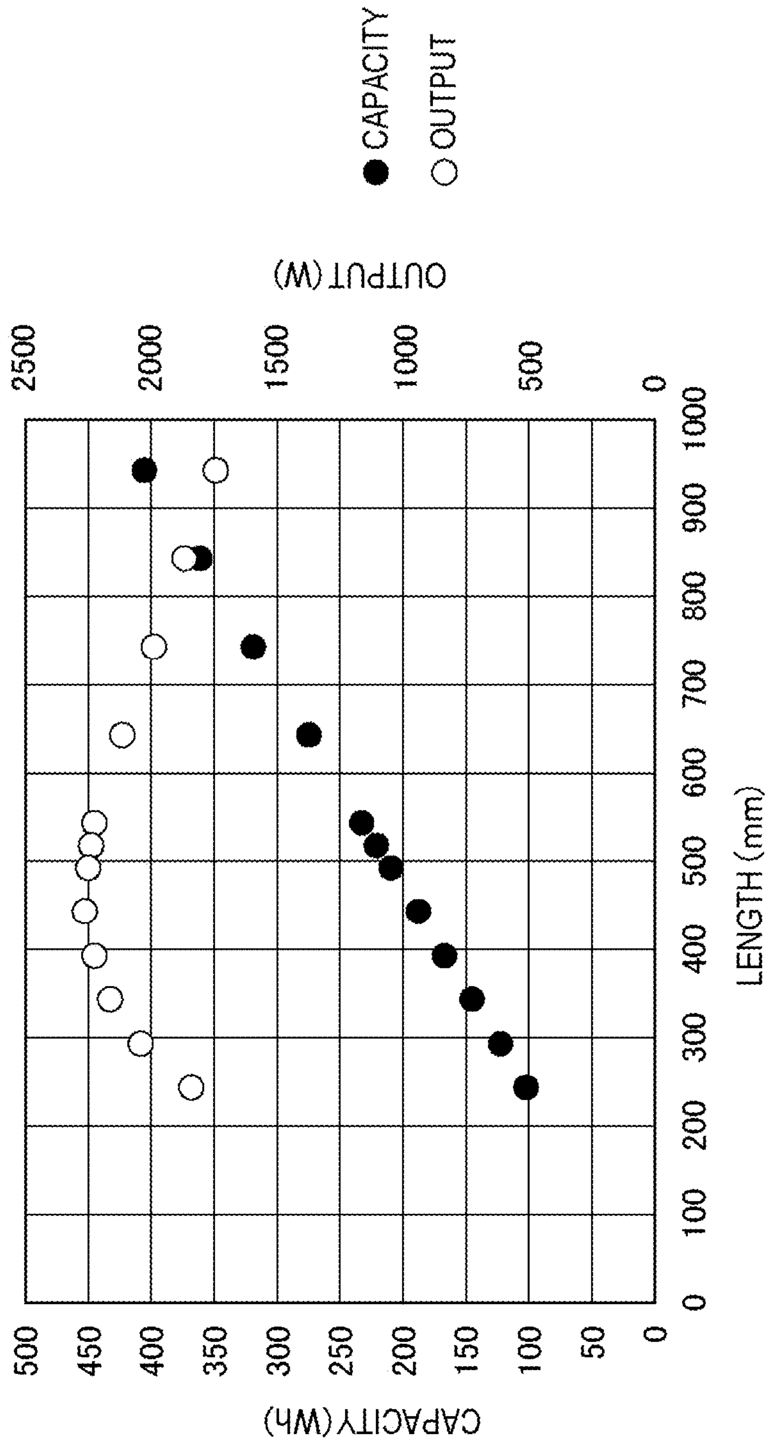
FIG. 9 is a graph illustrating an example of a relation between the length of the positive electrode active material layer in the longitudinal direction, and the capacity of the battery and the output of the battery when the battery includes a 54-layer positive electrode.

FIG. 4 is a graph illustrating an example of a relation between the length of the positive electrode active material layer in the longitudinal direction, and the capacity of the battery and the output of the battery when the battery includes a 16-layer positive electrode. FIG. 5 is a graph illustrating an example of a relation between the length of the positive electrode active material layer in the longitudinal direction, and the capacity of the battery and the output of the battery when the battery includes a 23-layer positive electrode. FIG. 6 is a graph illustrating an example of a relation between the length of the positive electrode active material layer in the longitudinal direction, and the capacity of the battery and the output of the battery when the battery includes a 31-layer positive electrode. FIG. 7 is a graph illustrating an example of a relation between the length of the positive electrode active material layer in the longitudinal direction, and the capacity of the battery and the output of the battery when the battery includes a 42-layer positive electrode. FIG. 8 is a graph illustrating an example of a relation between the length of the positive electrode active material layer in the longitudinal direction, and the capacity of the battery and the output of the battery when the battery includes a 50-layer positive electrode. FIG. 9 is a graph illustrating an example of a relation between the length of the positive electrode active material layer in the longitudinal direction, and the capacity of the battery and the output of the battery when the battery includes a 54-layer positive electrode.

In FIG. 4 to FIG. 9, the horizontal axis of a graph represents the length (unit: mm) of the positive electrode active material layer in the longitudinal direction. The vertical axis on the left side of the graph represents the capacity (unit: Wh) of the battery. The vertical axis on the right side of the graph represents the output (unit: W) of the battery.

The battery was manufactured as follows in FIG. 4 to FIG. 9.

Production of Positive Electrode Active Material

A metal composite hydroxide forming a solid solution with nickel, cobalt, and manganese at a molar ratio of 80:10:10 was produced by a coprecipitation method by continuously sharing sodium hydroxide and ammonia with an aqueous solution (1.0 mol/L) in which nickel sulfate, cobalt sulfate and manganese sulfate are dissolved in such a way to make the pH value 11.0. An NMC composite oxide was acquired as a lithium-nickel-cobalt-manganese composite oxide by weighing the metal composite oxide and lithium hydroxide in such a way that the ratio between the total molarity of metals (Ni, Co, and Mn) other than Li and the molarity of Li was 1:1, then sufficiently mixing the resulting product, raising the temperature of the product at a rate of 5° C./min, calcining the product in an oxygen atmosphere at 700° C., for 2 hours, then raising the temperature at a rate of 3° C./min, firing the product at 750° C., for 10 hours, and cooling the product to the room temperature.

Production of Positive Electrode Plate

Positive electrode active material slurry was produced by mixing 97 weight % of the positive electrode active material acquired as described above, 1.2 weight % of a carbon nanotube being a conductive assistant, 1.8 weight % of poly(vinylidene fluoride) (PVdF) being a binder resin, and a suitable amount of N-methyl-2-pyrrolidone (NMP) being a slurry viscosity regulating solvent. The positive electrode active material slurry was applied on both sides of aluminum foil being a positive electrode collector and then was dried. Subsequently, pressing was performed and a positive electrode plate was produced in such a way that the weight per unit area of a positive electrode active material layer on both sides of the positive electrode plate was 32.1 mg/cm$^2$.

Production of Negative Electrode Plate

Graphite powder and SiO powder were used as negative electrode active materials. Negative electrode active material slurry was produced by uniformly mixing the powders, styrene-butadiene rubber (SBR) and carboxymethylcellulose (CMC) being binder resins in such a way that the ratio therebetween was graphite:SiO:SBR:CMC=94:3:2:1 and adding the resulting product to NMP being a solvent. The negative electrode active material slurry was applied on both sides of copper foil being a negative electrode collector and then was dried. Subsequently, pressing was performed, and a negative electrode plate was produced in such a way that the weight per unit area of a negative electrode active material laver of the negative electrode plate was 19.8 $mg/cm^2$.

Production of Battery

A positive electrode was acquired by cutting out part of the positive electrode plate produced as described above. Twelve types of positive electrodes with different lengths of the positive electrode active material layer in the longitudinal direction were prepared, as plotted in each graph in FIG. 4 to FIG. 9. For each positive electrode, the length of the positive electrode active material layer in the transverse direction was determined to be 88 mm. Further, a negative electrode was acquired by cutting out part of the negative electrode plate produced as described above. Twelve types of negative electrodes with the lengths of the negative electrode active material layers in the longitudinal direction being 102% of the lengths of the positive electrode active material layers in the aforementioned 12 types of positive electrodes in the longitudinal direction, respectively, were prepared. For each negative electrode, the length of the negative electrode active material layer in the transverse direction was determined to be 90 mm. A stacked body was produced by alternately stacking a predetermined number of layers of positive electrodes and a predetermined number of layers of negative electrodes through separators. In FIG. 4, FIG. 5, FIG. 6, FIG. 7, FIG. 8, and FIG. 9, the total numbers of positive electrodes were determined to be 16, 23, 31, 42, 50, and 54, respectively. In each of FIG. 4 to FIG. 9, the total number of negative electrodes was determined to be greater than the total number of positive electrodes by one. A battery was produced by storing the stacked body in a laminated film being an exterior material and injecting an electrolytic solution.

In FIG. 4 to FIG. 9, the capacity of the battery 10 was measured as follows. First, charging was performed to a charging voltage of 4.2 V at ⅓ C on condition of constant current-constant voltage (CC-CV) at 25° C. Subsequently, discharging was performed to 2.5 V at ⅓ C on condition of constant current, and then the capacity was measured.

In FIG. 4 to FIG. 9, the output of the battery 10 was measured as follows. First, charging was performed to a charging voltage of 4.2 V at ⅓ C on condition of constant current-constant voltage (CC-CV) at 25° C. Subsequently, discharging was performed at 1 C for 30 minutes on condition of constant current, and the charging depth was adjusted to 50%. Subsequently, discharging was performed at 1 C for 10 seconds. The voltage immediately before performing the discharging at 1 C for 1) seconds after adjusting the charging depth to 50% is denoted by V1 (unit. V). The voltage after performing the discharging at 1 C for 10 seconds is denoted by V2 (unit: V). The difference between the voltage V1 and the voltage V2 is denoted by ΔV (unit: V1). A direct current resistance DCR (unit: Ω) was calculated by dividing the difference ΔV by the discharged current value. A maximum current value (unit: A) was calculated by (V1−3.0)/DCR=I, and the product of the maximum current value I and the voltage 3.0 V was determined to be the output.

As is apparent from FIG. 4 to FIG. 9, the capacity of the battery increases in proportion to the length of the positive electrode active material layer in the longitudinal direction. Further, the proportionality constant is constant regardless of the number of positive electrodes.

As is apparent from FIG. 4 to FIG. 9, the output of the battery exhibits a concave function in a range of the length of the positive electrode active material layer in the longitudinal direction from approximately 200 mm to 1000 mm in such a way as to take on a relative maximum value in a range of the length of the positive electrode active material layer in the longitudinal direction from approximately 400 mm to 600 mm. The relative maximum value of the output of the battery and the length of the positive electrode active material layer in the longitudinal direction at which the output of the battery takes on the relative maximum value vary depending on the number of positive electrodes.

In each graph in FIG. 4 to FIG. 9, the output of the battery at the length of the positive electrode active material layer in the longitudinal direction equal to or greater than 300 mm and equal to or less than 740 mm is roughly 80% of the relative maximum value of the output of the battery or greater. Further, the output of the battery at the length of the positive electrode active material layer in the longitudinal direction equal to or greater than 390 mm and equal to or less than 640 mm is roughly 90% of the relative maximum value of the output of the battery or greater. Accordingly, the length of the positive electrode active material layer in the longitudinal direction may be determined to be equal to or greater than 300 mm and equal to or less than 740 mm and preferably equal to or greater than 390 mm and equal to or less than 640 mm, in terms of high capacity and high output of the battery.

Figure 10:
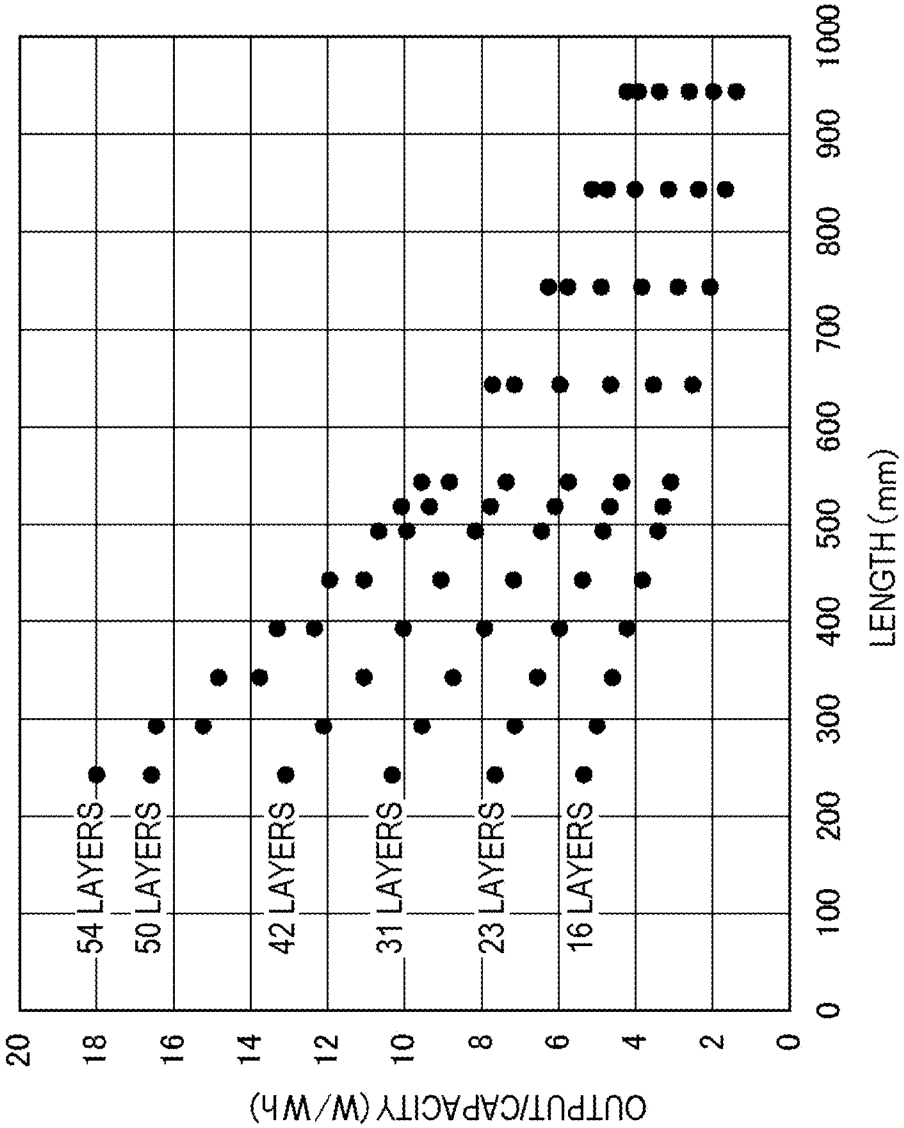
FIG. 10 is a graph illustrating an example of a relation between the length of the positive electrode active material layer in the longitudinal direction and the ratio of the output of the battery to the capacity of the battery in each case of a stacked body including a 16-layer positive electrode, a 23-layer positive electrode, a 31-layer positive electrode, a 42-layer positive electrode, a 50-layer positive electrode, and a 54-layer positive electrode.

FIG. 10 is a graph illustrating an example of a relation between the length of the positive electrode active material layer in the longitudinal direction and the ratio of the output of the battery to the capacity of the battery in each case of the stacked body including a 16-layer positive electrode, a 23-layer positive electrode, a 31-layer positive electrode, a 42-layer positive electrode, a 50-layer positive electrode, and a 54-layer positive electrode.

In FIG. 10, the horizontal axis of the graph represents the length (unit: mm) of the positive electrode active material layer in the longitudinal direction. The vertical axis of the graph represents the ratio (unit: W/Wh) of the output (unit: W) to the capacity (unit: Wh) of the battery.

As illustrated in FIG. 10, when the number of positive electrodes is equal to or greater than 23 and equal to or less than 54, the ratio of the output to the capacity of the battery at the length of the positive electrode active material layer in the longitudinal direction equal to or greater than 300 mm and equal to or less than 740 mm is roughly equal to or greater than 3 W/Wh and equal to or less than 17 W/Wh. When the ratio of the output to the capacity of the battery is less than 3 W/Wh, the resistance of the battery is too high, and therefore a load characteristic cannot be followed when the battery is used as an on-vehicle battery. The number of positive electrodes may be determined to be equal to or greater than 23 and preferably equal to or greater than 31, in terms of resistance of the battery. Further, when the ratio of the output to the capacity of the battery is greater than 17 W/Wh, the capacity of the battery per unit area may run short. The number of positive electrodes may be determined to be equal to or less than 54 and preferably equal to or less than 50, in terms of capacity of the battery per unit area.

Figure 11:
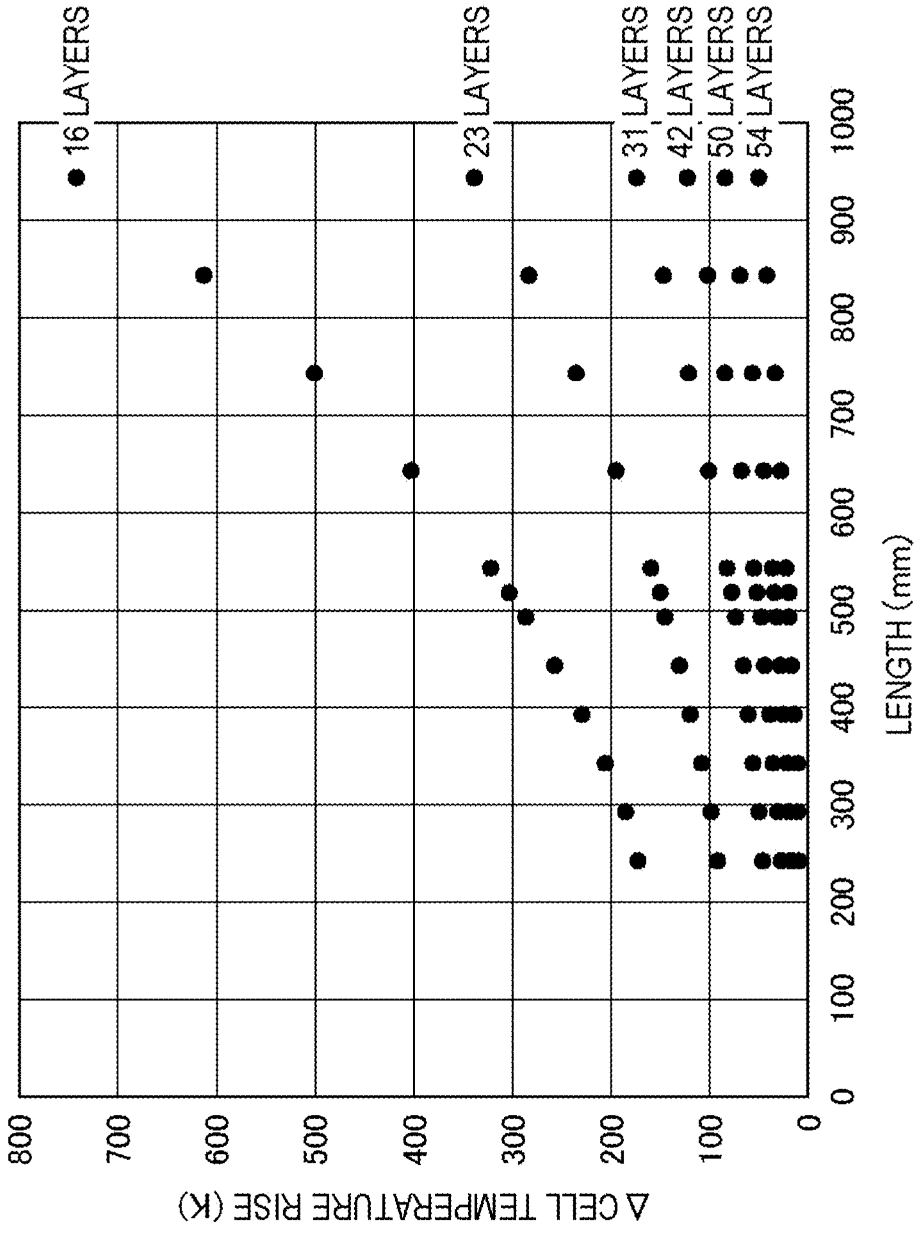
FIG. 11 is a graph illustrating an example of a relation between the length of the positive electrode active material layer in the longitudinal direction and the cell temperature rise of the battery in each case of the stacked body including a 16-layer positive electrode, a 23-layer positive electrode, a 31-layer positive electrode, a 42-layer positive electrode, a 50-layer positive electrode, and a 54-layer positive electrode.

FIG. 11 is a graph illustrating an example of a relation between the length of the positive electrode active material layer in the longitudinal direction and the cell temperature rise of the battery in each case of the stacked body including a 16-layer positive electrode, a 23-layer positive electrode, a 31-layer positive electrode, a 42-laver positive electrode, a 50-layer positive electrode, and a 54-layer positive electrode.

In FIG. 11 the horizontal axis of the graph represents the length (unit: mm) of the positive electrode active material layer in the longitudinal direction. The vertical axis of the graph represents the cell temperature rise (unit: K) of the battery.

In FIG. 11, the cell temperature rise of the battery was measured as follows. First, charging was performed to a charging voltage of 4.2 V at ⅓ C on condition of constant current-constant voltage (CC-CV) at 25° C. Subsequently, a maximum cell temperature was measured when discharging was continuously performed to 2.5 V at 6 C on condition of constant current. The difference between the maximum cell temperature and the cell temperature after the charging and before the continuous discharging was determined to be a cell temperature rise.

As illustrated in FIG. 11, when the number of positive electrodes is equal to or greater than 23 and equal to or less than 54, the cell temperature rise of the battery at the length of the positive electrode active material layer in the longitudinal direction equal to or greater than 300 mm and equal to or less than 740 mm is approximately 230K or less. When the cell temperature rise exceeds 230K, the risk of the battery catching fire sharply rises. The number of positive electrodes 100 may be equal to or greater than 23 and preferably equal to or greater than 31 in terms of reduction in the risk of the battery catching fire.

While the embodiments of the present invention and the examples thereof have been described above with reference to the drawings, the embodiments and the examples are exemplifications of the present invention, and various configurations other than those described above may be employed.

This application claims priority based on Japanese Patent Application No. 2021-019627 filed on Feb. 10, 2021, the disclosure of which is hereby incorporated by reference thereto in its entirety.

REFERENCE SIGNS LIST

10 Battery
20 Stacked body
100 Positive electrode
110 Positive electrode collector
122 First positive electrode active material layer
124 Second positive electrode active material layer
130 Positive electrode lead
200 Negative electrode
210 Negative electrode collector
222 First negative electrode active material layer
224 Second negative electrode active material layer
230 Negative electrode lead
300 Separator
310 Substrate
400 Exterior material
X First direction
Y Second direction
Z Third direction

The invention claimed is:

1. A battery comprising a plurality of positive electrodes, a plurality of negative electrodes and a separator, wherein each of the positive electrodes includes a positive electrode collector and a positive electrode active material layer containing a positive electrode active material expressed by a general formula $Li_xNi_yCo_zM_{1-y-z}O_2$ (where $0.80 \le y \le 0.93$, $1 \le x \le 1.2$, y and z denote positive numbers satisfying $y+z<1$, and M denotes a metallic element containing at least one element selected from the group consisting of Mn and Al), and a length of the positive electrode active material layer in a longitudinal direction is equal to or greater than 300 mm and equal to or less than 740 mm, wherein the total number of the plurality of positive electrodes stacked on each other is equal to or greater than 16 and equal to or less than 54;

the total number of the plurality of negative electrodes stacked on each other is one greater than the total number of the plurality of positive electrodes stacked on each other;

the plurality of positive electrodes and the plurality of negative electrodes are alternately stacked in layers in a direction perpendicular to the longitudinal direction separated by the separator, and the separator extends zigzag passing through between the layered positive electrodes and negative electrodes.

2. The battery according to claim 1, wherein the total number of the plurality of positive electrodes is equal to or greater than 23 and equal to or less than 54.

3. The battery according to claim 1, wherein a length of the positive electrode active material layer in a transverse direction is equal to or greater than 70 mm and equal to or less than 120 mm.

4. The battery according to claim 1, wherein the positive electrode active material layer contains a lithium-nickel-cobalt-manganese composite oxide with a layered crystal structure expressed by the general formula.

5. The battery according to claim 1, wherein the positive electrode active material layer contains the positive electrode active material concentration of which is equal to or greater than 90 weight % with respect to a total weight 100 weight % of the positive electrode active material layer.

6. The battery according to claim 1, wherein weight per unit area of the positive electrode active material layer is equal to or greater than 25 $mg/cm^2$ and equal to or less than 50 $mg/cm^2$.

* * * * *